(12) United States Patent
Akutsu et al.

(10) Patent No.: US 7,427,858 B2
(45) Date of Patent: Sep. 23, 2008

(54) RESOLVER REFERENCE POSITION ADJUSTMENT METHOD

(75) Inventors: Satoru Akutsu, Tokyo (JP); Shinsuke Hemmi, Tokyo (JP); Shuji Isono, Tokyo (JP); Seiki Kodama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/346,370

(22) Filed: Feb. 3, 2006

(65) Prior Publication Data

US 2007/0074586 A1    Apr. 5, 2007

(30) Foreign Application Priority Data

Oct. 3, 2005    (JP) .............................. 2005-290002

(51) Int. Cl.
*G01R 35/00* (2006.01)
(52) U.S. Cl. ...................................... 324/202
(58) Field of Classification Search ................ 324/202, 324/207.25, 207.15; 310/168; 318/661; 73/1.75
See application file for complete search history.

(56) References Cited

U.S. PATENT DOCUMENTS

| | | | | |
|---|---|---|---|---|
| 4,392,375 A | * | 7/1983 | Eguchi et al. ............... | 73/118.1 |
| 5,528,140 A | * | 6/1996 | Fuki et al. ............... | 324/207.12 |
| 5,544,000 A | * | 8/1996 | Suzuki et al. ............... | 361/139 |
| 6,201,388 B1 | * | 3/2001 | Pecheny et al. ........... | 324/207.2 |
| 6,445,178 B1 | * | 9/2002 | Hoekstra ............... | 324/207.12 |
| 2003/0074799 A1 | * | 4/2003 | Nakano et al. ................. | 33/1 N |
| 2003/0137295 A1 | | 7/2003 | Akutsu et al. | |
| 2005/0168217 A1 | | 8/2005 | Nakano et al. | |

FOREIGN PATENT DOCUMENTS

JP    2001-128484 A    5/2001

* cited by examiner

*Primary Examiner*—Reena Aurora
*Assistant Examiner*—Kenneth J Whittington
(74) *Attorney, Agent, or Firm*—Sughrue Mion, PLLC (57) ABSTRACT

A resolver reference position adjustment method is capable of minimizing a detection error in the rotation angle of a rotor of a motor. In the resolver reference position adjustment method in which a reference position of a resolver of an axial double angle n mounted on an end of a shaft, to which the rotor of the motor is fixedly attached, for detecting rotation angles of the rotor is adjusted with respect to the rotor, the reference position of the resolver is adjusted by using the rotation angles of the rotor at a first point and at a second point, respectively, which are positions of the rotor apart an angle of (mechanical angle 180/axial double angle n) degrees from each other.

13 Claims, 8 Drawing Sheets

RESOLVER REFERENCE POSITION ADJUSTMENT METHOD

BACKGROUND OF THE INVENTION

1. Field of the Invention

The present invention relates to a method for adjusting the reference position of a resolver that is arranged at an end of a shaft for detecting the rotation angle of a rotor.

2. Description of the Related Art

In the past, in order to adjust the reference position of a resolver with respect to a rotor, a predetermined level of current is first supplied to a three-phase motor with its two phases short-circuited with each other thereby to stop the three-phase motor at its reference position, and the rotation angle of the rotor at that time is detected by the resolver, whereby the reference position of the resolver is adjusted from the value of the rotation angle of the rotor thus detected at the only one location (see a first patent document: Japanese patent application laid-open No. 2001-128484).

Figure 12:
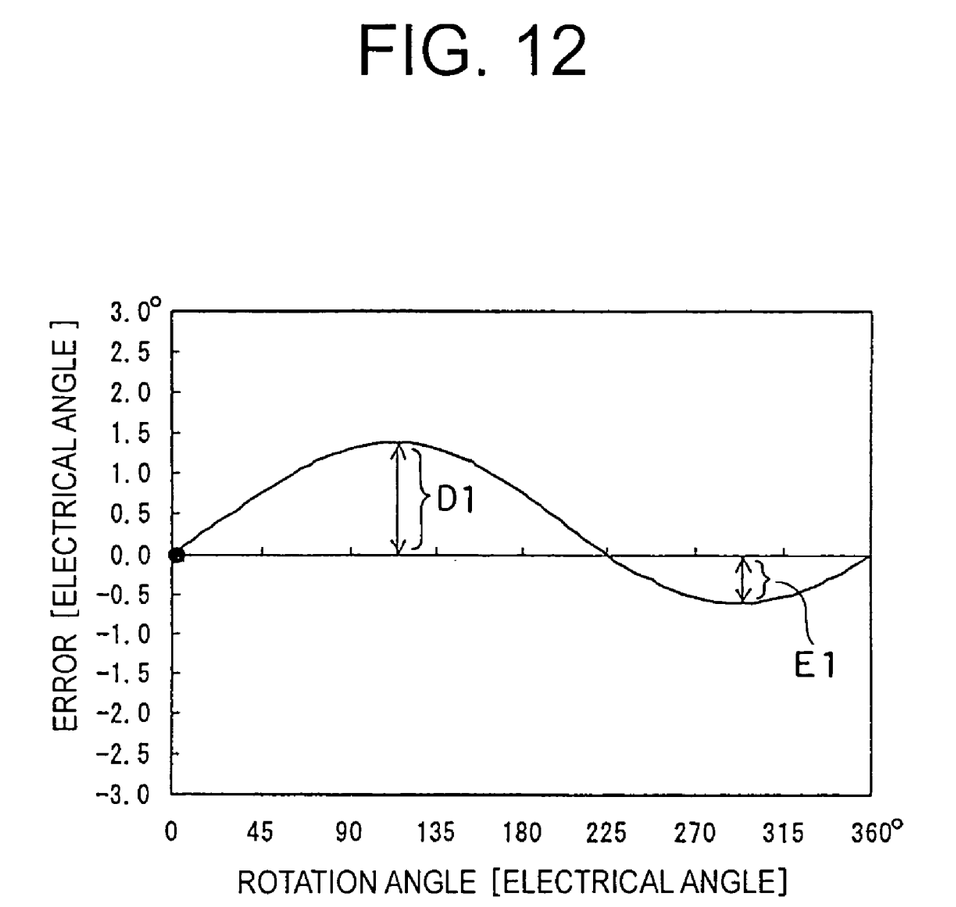
FIG. 12 is a view showing a relation between the rotation angle of the rotor and the detection error of the resolver after adjustment of the reference position of the resolver with respect to the rotor according to a known method.

In such a known resolver reference position adjustment method, the reference position of the resolver is adjusted in such a manner that an error in the rotation angle of the rotor detected by the resolver becomes zero in the reference position of the rotor, i.e., the error of the detection value of the resolver becomes zero when the rotation angle of the rotor is zero, as shown in FIG. 12.

However, though the error of the detection value detected by the resolver with respect to the rotation angle of the rotor is generally of a sinusoidal waveform, an error amplitude D1 on a positive (+) side and an error amplitude E1 on a negative (−) side are not equal to each other, as shown in FIG. 12. Accordingly, there is a problem that in case where the reference position of the resolver is adjusted according to this method, the rotation angle of the rotor has to be detected while leaving a rotation angle region (i.e., a range around D1) in which a large error will be generated when seen over the entire rotation angle region of the rotor (0 degrees to 360 degrees).

SUMMARY OF THE INVENTION

The present invention is intended to solve the problem as referred to above, and has for its object to provide a resolver reference position adjustment method which is capable of minimizing a detection error in the rotation angle of a rotor.

According to the present invention, there is provided a resolver reference position adjustment method in which a reference position of a resolver of an axial double angle n mounted on an end of a shaft, to which a rotor of a motor is fixedly attached, for detecting rotation angles of the rotor is adjusted with respect to the rotor, wherein the reference position of the resolver is adjusted by using the rotation angles of the rotor at a first point and at a second point, respectively, which are positions of the rotor apart an angle of degrees from each other.

By the resolver reference position adjustment method according to the present invention, it is possible to minimize a detection error in the rotation angle of the motor.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Hereinafter, a preferred embodiment of the present invention will be described while referring to the accompanying drawings. Throughout respective figures, the same or corresponding members or parts are identified by the same reference numerals and characters.

Embodiment 1

Figure 1:
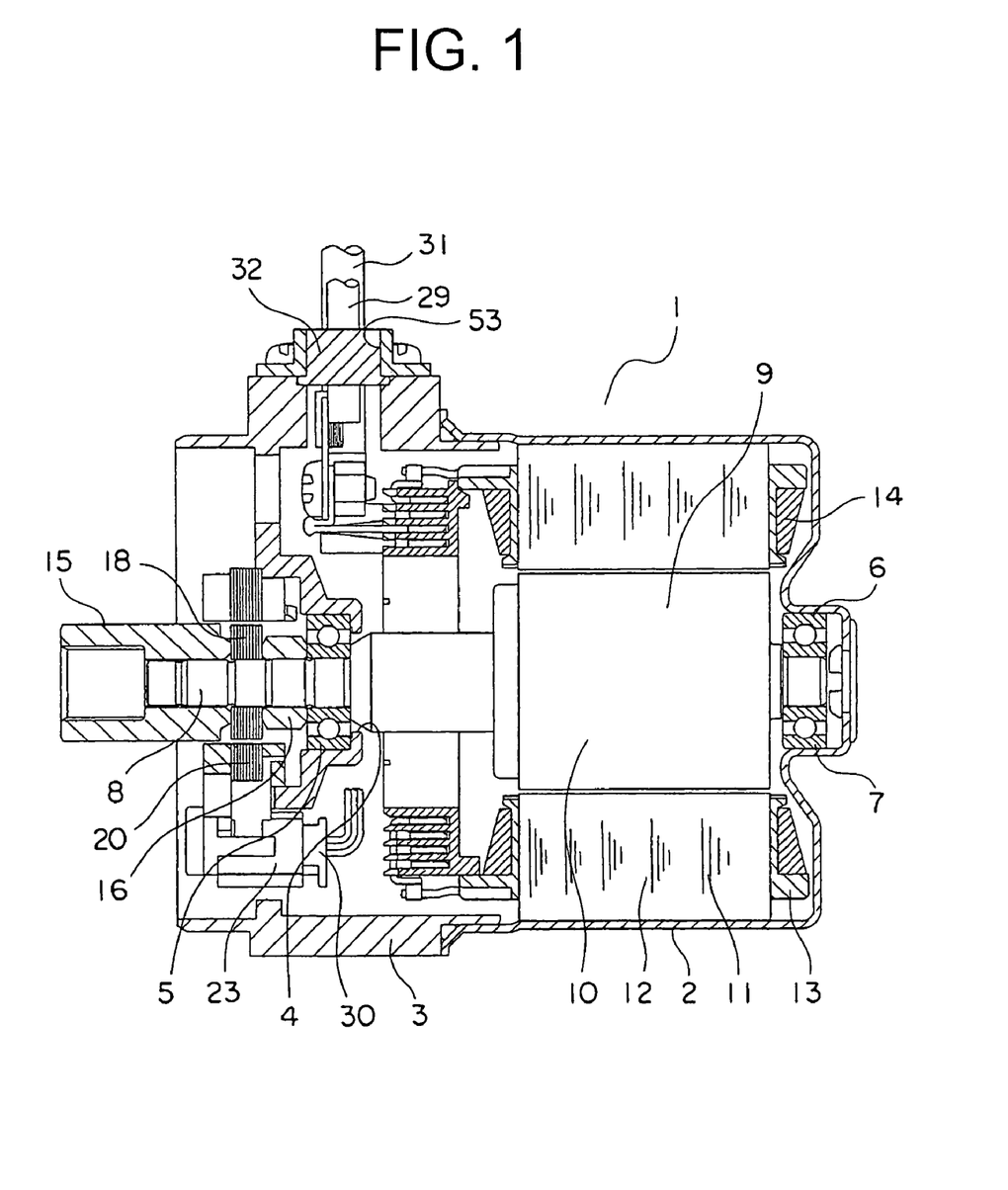
FIG. 1 is a cross sectional view showing a brushless motor according to a first embodiment of the present invention.
Figure 2:
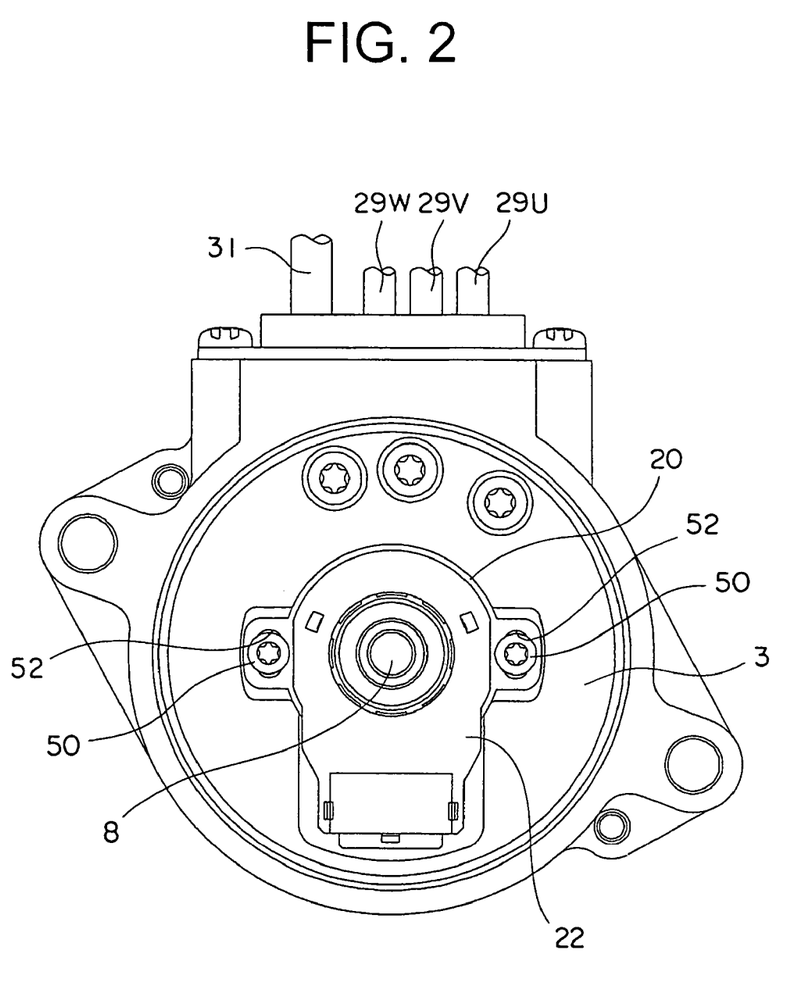
FIG. 2 is a front elevational view of the brushless motor of FIG. 1.

FIG. 1 is a cross sectional side view that shows a brushless motor 1 (hereinafter abbreviated as a motor) according to a first embodiment of the present invention, and FIG. 2 is a front elevational view of the motor 1 of FIG. 1.

In these figures, the motor 1 is a motor that is built into an electric power steering apparatus, and has a bottomed cylindrical frame 2 that is formed by drawing an iron plate, and a housing 3 that is made of aluminum and is fixedly secured to the frame 2 so as to cover an opening portion of the frame 2.

A front bearing 5 is mounted on the housing 3 with its outer ring being fixedly caulked to a window portion 4 formed in the center of the housing 3.

In addition, a concave-shaped bearing box 6 is formed on the bottom of the frame 2, and a rear bearing 7 is inserted in the bearing box 6.

The front bearing 5 and the rear bearing 7 serve to rotatably support a front end and a rear end, respectively, of a shaft 8 made of iron that is a magnetic material.

Mounted on one end of the shaft 8 is a rotor 10 with a magnet 9 attached thereto for generating a magnetic field. An unillustrated protective tube for protecting the magnet 9 is covered on the outer peripheral surface of the magnet 9.

A stator 11 enclosing the outer periphery of the rotor 10 is attached to the inner peripheral surface of the frame 2.

The stator 11 has a stator core 12 formed of laminated silicon steel plates, an insulator 13 made of resin, and a motor coil 14 wound around the insulator 13. The motor coil 14 is composed of a three-phase coil comprising a U-phase coil, a V-phase coil and a W-phase coil, and the coils of the respective phases are connected with one another in a star configuration.

A bush 16, being in abutting engagement with the front bearing 5, is press-fitted over the shaft 8 at a side of the housing 3 opposite to the rotor 10, and a boss 15, being spline coupled to an external mechanism, is press-fitted over an end of the shaft 8 at a side of the housing 3 opposite to the rotor 10.

Figure 3:
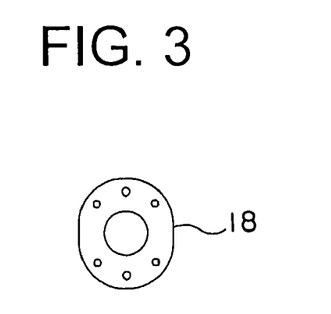
FIG. 3 is a front elevational view of a resolver rotor of FIG. 1.
Figure 4:
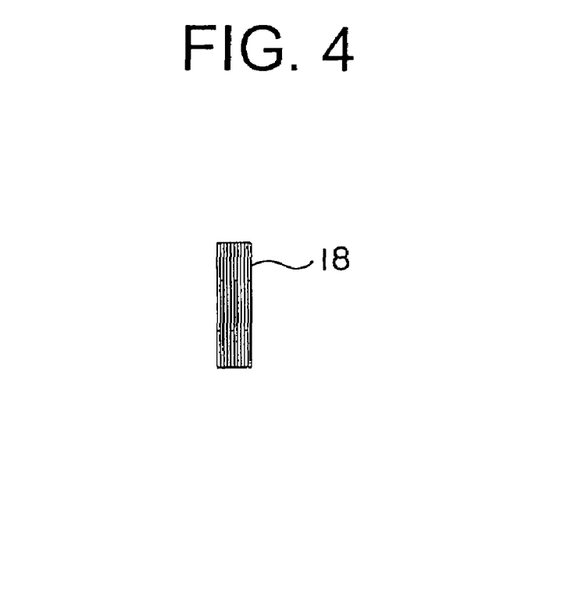
FIG. 4 is a side elevational view of FIG. 3.

A resolver rotor 18 with its opposite end surfaces being in abutting engagement with the bush 16 and the boss 15, respectively, is arranged between the bush 16 and the boss 15. As shown in FIGS. 3 and 4, the resolver rotor 18 of an elliptical shape is formed of laminated silicon steel plates, and is press-fitted over the shaft 8.

Figure 5:
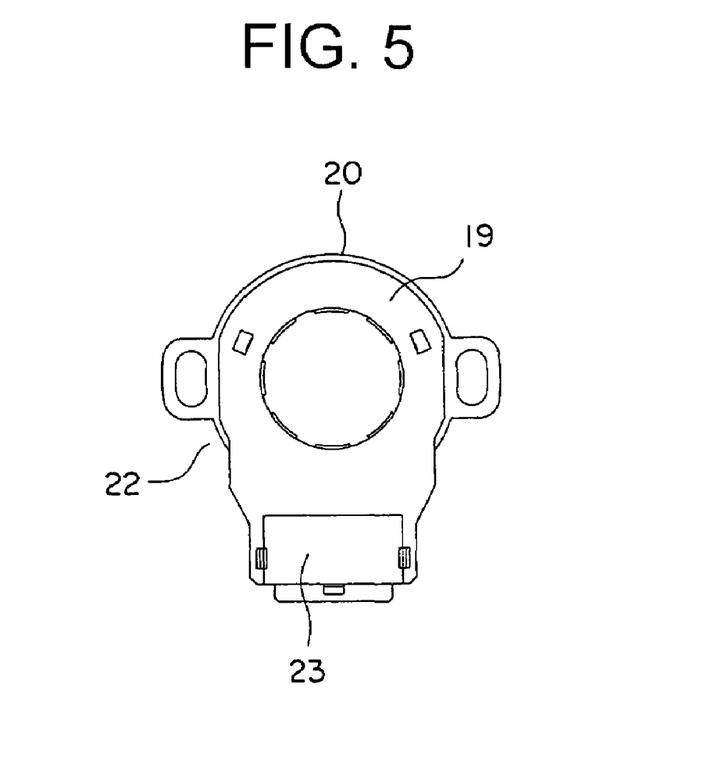
FIG. 5 is a front elevational view of a main body of a resolver shown in FIG. 1.
Figure 6:
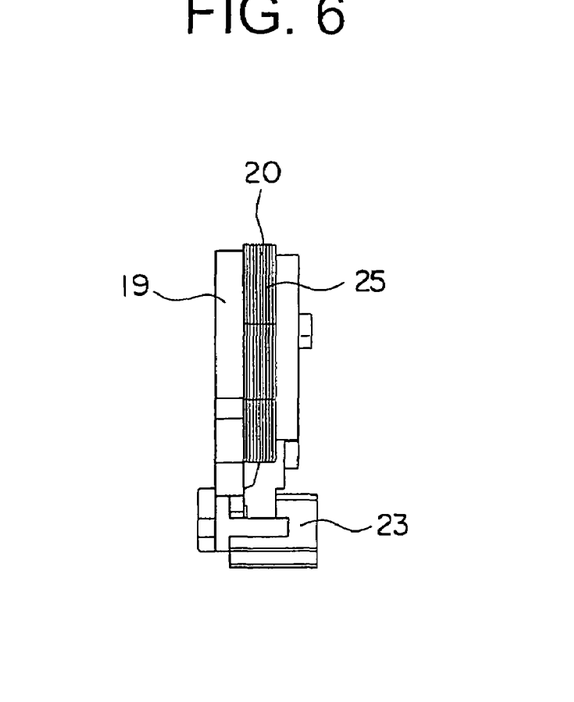
FIG. 6 is a side elevational view of FIG. 5.
Figure 7:
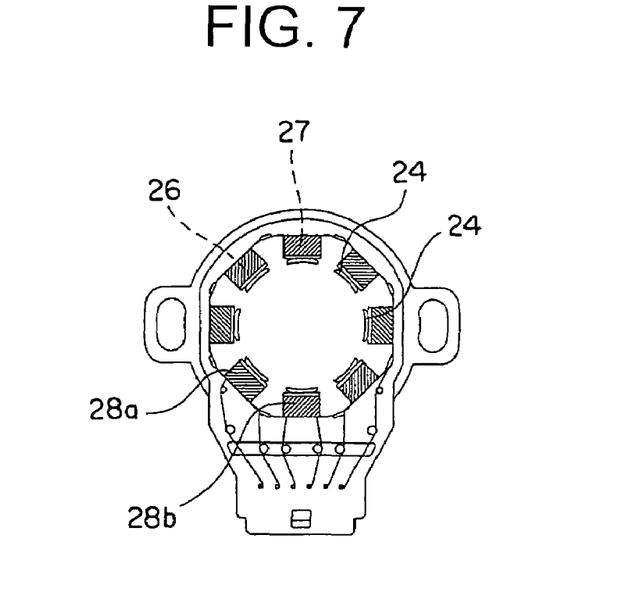
FIG. 7 is a front elevational view showing the interior of the resolver main body of FIG. 5.
Figure 8:
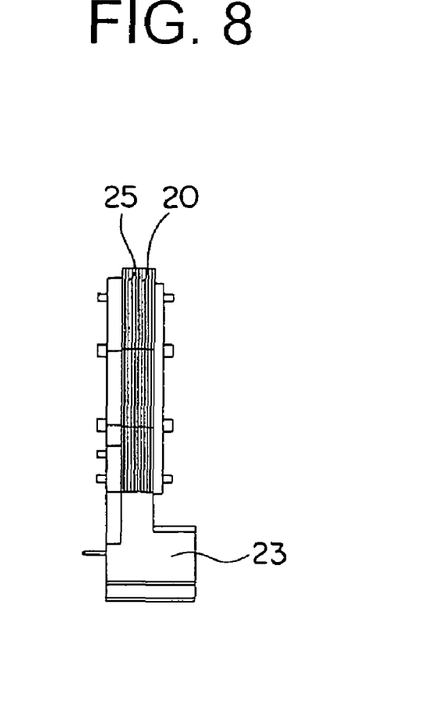
FIG. 8 is a side elevational view of FIG. 7.

FIG. 5 is a front elevational view of a resolver main body 22, and FIG. 6 is a right side view of FIG. 5. FIG. 7 is a view with a cover 19 being removed from the resolver main body 22 of FIG. 5, and FIG. 8 is a right side view of FIG. 7.

The resolver main body 22, cooperating with the resolver rotor 18 to constitute the resolver, is arranged so as to enclose the outer periphery of the resolver rotor 18. The resolver main body 22 is fixedly attached to the housing 3 by means of screws 50.

The resolver main body 22 is threaded to the housing 3 by the screws 50 which pass through loose holes 52 formed in a resolver stator 20, so it is rotatable about the shaft 8 with respect to the housing 3 by loosening the screws 50. By this rotation operation, it is possible to adjust the reference position of the resolver with respect to the rotor 10.

The resolver main body 22 has the resolver stator 20, the cover 19 with which the opposite side surfaces of the resolver stator 20 are covered, and a male side connector 23 for connection of a signal line.

The resolver stator 20 includes a laminated body 25 that is formed of laminated silicon steel plates and has a plurality of teeth 24 formed at equal intervals in a circumferential direction, an excitation winding 27 of one phase with its conductor being wound around the teeth 24 through an insulator 26, and a first output winding 28a and a second output winding 28b of two phases.

The excitation winding 27 of one phase is constructed by winding the conductor continuously around the respective adjoining teeth 24 over the entire circumference. The first output winding 28a is constructed by winding its conductor continuously on the excitation winding 27 around every other one of the adjoining teeth 24. Also, the second output winding 28b is constructed by winding its conductor continuously on the excitation winding 27 around every other one of the adjoining teeth 24. The first output winding 28a and the second output winding 28b are wound around the laminated body 25 in a mutually adjacent positional relation with respect to each other.

Motor lead wires $29_U$, $29_V$, $29_W$, which are connected to the motor coil 14 for supplying electric power thereto, are arranged to penetrate through a grommet 32 fitted into a lead hole 53 formed in the housing 3. In addition, a sensor lead wire 31, which is connected to the male side connector 23 through a female side connector 30 for transmitting a signal related to the rotation angle of the rotor 10 to the outside, is also arranged to penetrate through the grommet 32.

Figure 9:
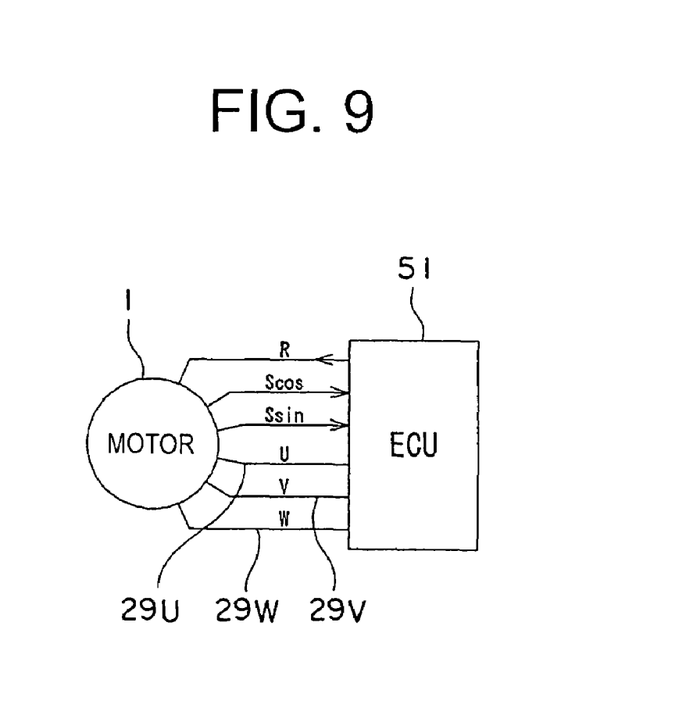
FIG. 9 is a view showing a relation between the motor and an ECU of FIG. 1.

FIG. 9 is a view that shows a connection relation between the motor 1 and an ECU 51 (Electronic Control Unit). An excitation signal R from the ECU 51 is sent to the motor 1 through the sensor lead wire 31, and output signals Scos, Ssin from the first output winding 28a and the second output winding 28b of the resolver of the motor 1 are also sent to the ECU 51 through the sensor lead wire 31. In addition, a drive current from the ECU 51 is supplied to the motor 1 through the three motor lead wires $29_U$, $29_V$, $29_W$.

Hereinbelow, reference will be made to the operation of the motor 1 of the above-mentioned construction.

An excitation voltage in the form of a sinusoidal excitation signal R of 10 kHz and 5 Vpp from the ECU 51 is impressed to the excitation winding 27 of the resolver stator 20. By the impression of the excitation voltage to the excitation winding 27, an excitation current flows to the excitation winding 27, so that a magnetic flux is generated in a space defined between the resolver rotor 18 and the resolver stator 20.

Moreover, electric power is supplied from the motor lead wires $29_U$, $29_V$, $29_W$ to the motor coil 14, so that a three-phase alternating voltage is impressed to the motor coil 14. By the impression of the three-phase alternating voltage to the motor coil 14, a rotating field is generated in the motor coil 14 whereby the rotor 10 is caused to rotate.

Together with the rotation of the rotor 10, the resolver rotor 18 is also rotated whereby a gap permeance between the resolver rotor 18 and the resolver stator 20 is changed, as a result of which the amplitude and the phase to the excitation signal R of each of the output signal Scos from the first output winding 28a and the output signal Ssin from the second output winding 28b are caused to change.

The amplitude changes of the output signals Scos and the output signal Ssin are out of phase by 90 degrees with respect to each other, and the output signal Scos and the output signal Ssin are respectively sent through the sensor lead wire 31 to the ECU 51, where they are subjected to appropriate signal processing so that the rotation angle of the rotor 10 is thereby detected.

Here, the excitation signal R is represented by the following expression (1).

$$R = E \times \sin \omega t \tag{1}$$

Also, the output signal Scos of the first output winding 28a and the output signal Ssin of the second output winding 28b are represented by the following expressions (2) and (3), respectively.

$$S\cos = K \times E \times \sin \omega t \times \cos(\theta) \tag{2}$$

$$S\sin = K \times E \times \sin \omega t \times \sin(\theta) \tag{3}$$

where E is the excitation voltage; K is the voltage transformation ratio of the resolver; ω is the angular velocity of the excitation signal R; t is time; and θ is the electrical angle of the resolver.

Further, the electrical angle θ is obtained by the following expression (4).

$$\theta = \tan^{-1}(S\sin/S\cos) \tag{4}$$

In this case, the output signal Scos and the output signal Ssin are each generated in the form of a sinusoidal wave of 10 kHz, as in the case of the excitation signal R, so they are detected as amplitude values, and the signs of the output signals are calculated in such a manner that they are positive or plus when the excitation signal R and the output signals Scos, Ssin are of the same phase and negative or minus when they are of opposite phases.

Next, reference will be made to a method for adjusting the reference position of the resolver with respect to the rotor 10.

Figure 10:
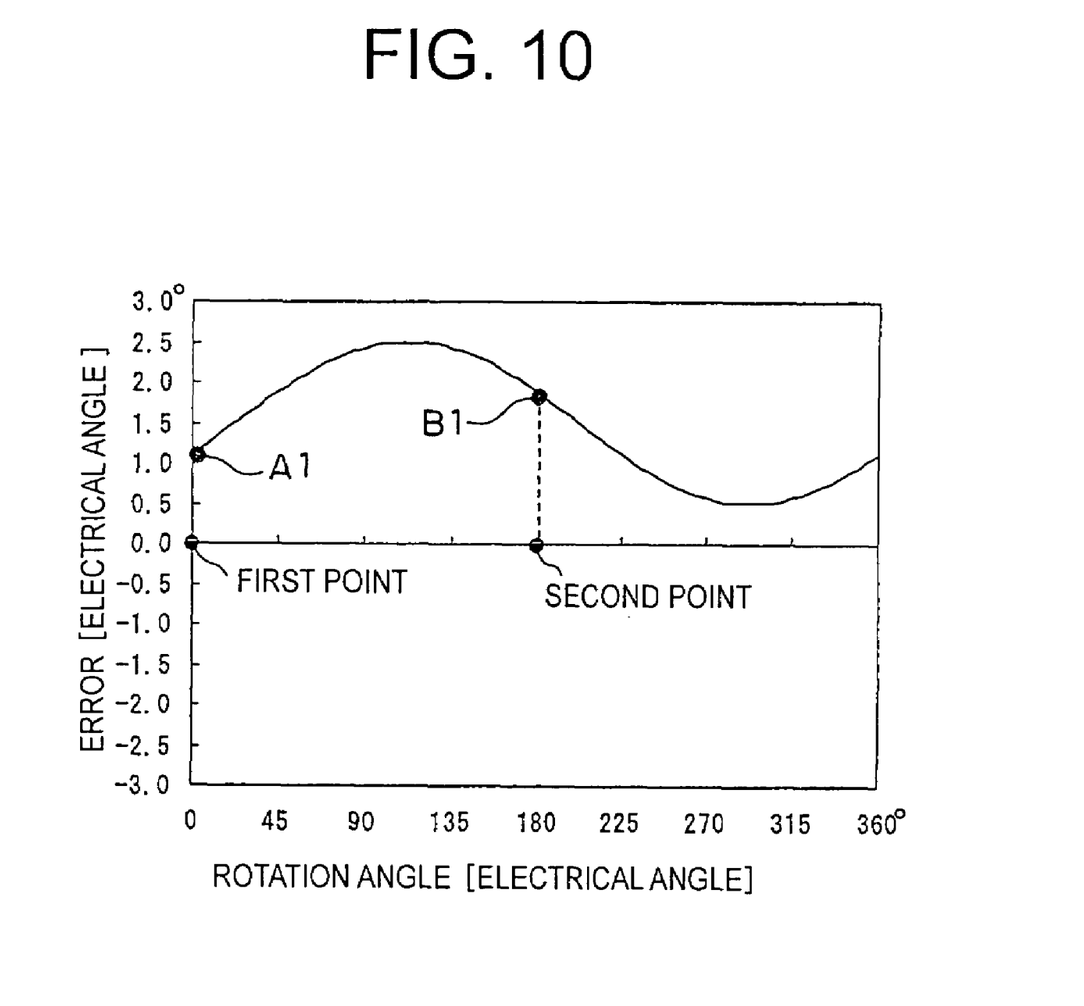
FIG. 10 is a view showing a relation between the rotation angle of the rotor and the detection error of the resolver before adjustment of the reference position of the resolver.

A detection error of the resolver angle generally becomes a sinusoidal waveform that changes one period per electrical angle of 360 degrees of the resolver, as shown in FIG. 10.

Here, note that the electrical angle of the resolver is represented by a mechanical angle x (multiplied by) an axial double or multiple angle n of the resolver. Herein, the resolver axial double or multiple angle is a value how many times the detection angle of the resolver changes per mechanical angle of 360 degrees, and the electrical angle of the resolver is generally made coincident with the electrical angle of the motor 1 but can be available even if set equal to ½, ¼, etc., of the electrical angle of the motor 1.

Here, by supplying a direct current to a coil of a certain phase, the rotor 10 is caused to stop at a position (first point) at which the detection angle of the resolver should be zero degrees. Then, the detection angle of the resolver at this first point is actually measured, and the value of an error or difference at the first point is obtained from this measurement (A1 in FIG. 10).

Thereafter, the rotor 10 is rotated up to the position of a second point apart a mechanical angle of 180/n degrees (=an electrical angle of 180 degrees, n being an axial double angle of the resolver) from the first point, and a direct current is supplied to a coil of a phase different from that of the first-mentioned coil thereby to stop the rotor 10. Then, the detection angle of the resolver at this second point is actually measured, and the value of an error or difference at the second point is obtained from this measurement (B1 in FIG. 10).

An adjustment target value "C" of the second point is calculated according to the following expression (5) by using these two values "A1" and "B1".

$$\text{target value } C = B1 - (A1 + B1)/2 \tag{5}$$

Then, the screws 50 are loosened so as to adjust the value of the second point to "C", and the resolver main body 22 is rotated about the shaft 8 so as to adjust the reference position thereof with respect to the rotor 10. Thereafter, the resolver main body 22 is fixed to the housing 3 by tightening the screws 50.

Figure 11:
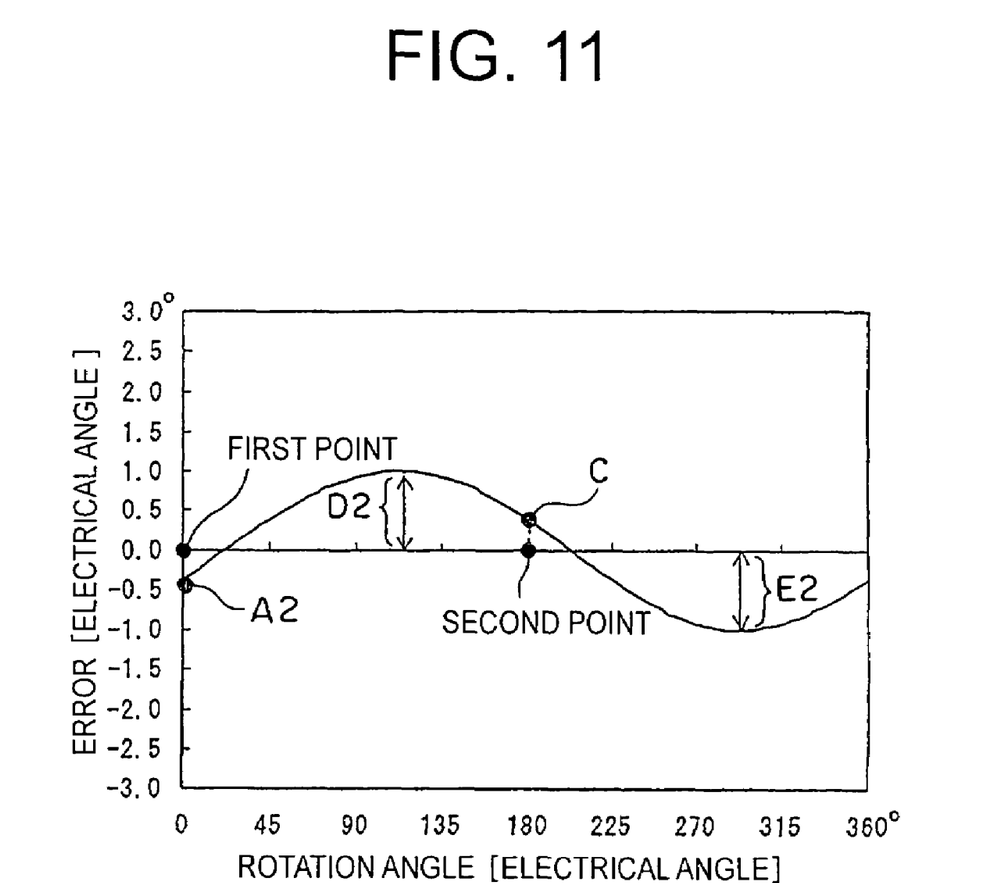
FIG. 11 is a view showing a relation between the rotation angle of the rotor and the detection error of the resolver after adjustment of the reference position of the resolver with respect to the rotor.

FIG. 11 is a view that shows a detection error of the resolver after adjustment of the reference position thereof, in which the detection error, being a value "B1" at the second point, is adjusted to a value "C".

The detection angle of the resolver is a value "A2" at the first point at which the detection angle of the resolver should originally be 0 degrees, so there remains an error in the resolver detection angle. This is because the resolver detection error of the sinusoidal waveform is not necessarily symmetric in its amplitude on the positive or plus side and on the negative or minus side.

Thus, the target value C is obtained from the above expression (5), and the reference position of the resolver main body 22 with respect to the rotor 10 is adjusted based on this value C, whereby a positive side error amplitude "D2" and a negative side error amplitude "E2" are made equal to each other. As a result, the detection error of the resolver is adjusted in such a manner as to minimize its maximum value.

By adjusting the reference position of the resolver that detects the rotation angle of the rotor 10 in this manner, the maximum value of the detection error of the resolver can be minimized, as a consequence of which torque ripples of the motor can also be reduced.

In addition, since the motor is built into the electric power steering apparatus, a variation in the right and left steering forces of a steering wheel is reduced, and at the same time, comfortable steerability is obtained.

While the invention has been described in terms of a preferred embodiment, those skilled in the art will recognize that the invention can be practiced with modifications within the spirit and scope of the appended claims.

What is claimed is:

1. A resolver reference position adjustment method in which a reference position of a resolver of an axial double angle n mounted on an end of a shaft, to which a rotor of a motor is fixedly attached, for detecting rotation angles of said rotor is adjusted with respect to said rotor, wherein said reference position of said resolver is mechanically adjusted by using said rotation angles of said rotor at a first point and at a second point, respectively, which are positions of said rotor apart an angle of (mechanical angle 180/axial double angle n) degrees from each other.

2. The resolver reference position adjustment method as set forth in claim 1, wherein assuming that the value of an error of said rotation angle of said rotor at said first point is represented by A and the value of an error of said rotation angle of said rotor at said second point is represented by B, an adjustment target value C at said second point is calculated by the following expression:

$$C = B - (A+B)/2.$$

3. The resolver reference position adjustment method as set forth in claim 1, wherein said motor is a motor that is built into an electric power steering apparatus.

4. The resolver reference position adjustment method as set forth in claim 1, wherein said reference position of said resolver is mechanically adjusted by an adjustment target value that equals to an error of said rotation angle of said rotor at said second point.

5. The resolver reference position adjustment method as set forth in claim 1, wherein the reference position of said resolver refers to the position of said resolver with respect to the position of said rotor.

6. The resolver reference position adjustment method as set forth in claim 1, wherein said resolver is rotated about the shaft to adjust the reference position of said resolver with respect to said rotor.

7. The resolver reference position adjustment method as set forth in claim 1, wherein the adjustment is made to reduce a detection error of a value of said rotation angles of said rotor.

8. The resolver reference position adjustment method as set forth in claim 1, wherein said mechanical adjustment is directly based on the rotation angles of said rotor.

9. A resolver reference position adjustment method comprising:

adjusting a reference position of a resolver of an axial double angle n mounted on an end of a shaft, with respect to a rotor of a motor, wherein said rotor is fixedly attached to the shaft, wherein said resolver detects rotation angles of said rotor, and wherein said reference position of said resolver is mechanically adjusted by using said rotation angles of said rotor at a first point and at a second point, respectively, which are positions of said rotor apart an angle of (mechanical angle 180/axial double angle n) degrees from each other.

10. The resolver reference position adjustment method as set forth in claim 9, wherein assuming that the value of an error of said rotation angle of said rotor at said first point is represented by A and the value of an error of said rotation angle of said rotor at said second point is represented by B, an adjustment target value C at said second point is calculated by the following expression:

$$C = B - (A+B)/2.$$

11. The resolver reference position adjustment method as set forth in claim 9, wherein said reference position of said resolver is mechanically adjusted by an adjustment target value that equals to an error of said rotation angle of said rotor at said second point.

12. The resolver reference position adjustment method as set forth in claim 9, wherein said mechanical adjustment is directly based on the rotation angles of said rotor.

13. A resolver reference position adjustment method in which a reference position of a resolver of an axial double angle n mounted on an end of a shaft, to which a rotor of a motor is fixedly attached, for detecting rotation angles of said rotor is adjusted with respect to said rotor, wherein said reference position of said resolver is adjusted by using said rotation angles of said rotor at a first point and at a second point, respectively, which are positions of said rotor apart an angle of (mechanical angle 180/ axial double angle n) degrees from each other, and wherein said resolver is rotated about the shaft to adjust the reference position of said resolver with respect to said rotor.

* * * * *